United States Patent Office 2,800,431
Patented July 23, 1957

2,800,431

HYDROCATALYTIC DESULPHURISATION OF PETROLEUM HYDROCARBONS

Frederick William Bertram Porter and Roy Purdy Northcott, Sunbury-on-Thames, England, assignors to The British Petroleum Company Limited No Drawing. Application November 16, 1954, Serial No. 469,316

Claims priority, application Great Britain November 24, 1953

4 Claims. (Cl. 196—28)

This invention relates to the hydrocatalytic desulphurisation of petroleum hydrocarbons.

It is well-known that organically combined sulphur contained in petroleum hydrocarbons may be removed by contacting the hydrocarbons with added hydrogen at elevated temperature and pressure in the presence of a sulphur-resistant hydrogenation catalyst whereby the organically combined sulphur is converted to hydrogen sulphide which may readily be removed from the treated hydrocarbons. Such processes are commonly called hydrofining processes and are usually carried out at temperatures and pressures which are optimum for the hydrogenation reaction. Thus, pressures of the order of 1000 lb./sq. in. are employed and at such pressures there is a considerable consumption of hydrogen the cost of which is an important factor in the economics of the process.

A more recent development is the so-called autofining process wherein the petroleum hydrocarbons are contacted with a sulphur-resistant dehydrogenation-hydrogenation catalyst at a temperature and pressure such that the hydrogen required for desulphurisation is obtained by controlled dehydrogenation of the feedstock. Such a process forms the subject of United States Patents Nos. 2,573,726 and 2,574,445–51. The autofining process was originally operated at a fixed pressure and any hydrogen generated in excess of that required to maintain this fixed pressure was vented from the system. It was found, however, that increased desulphurisation was obtained by recycling all the hydrogen produced during the reaction and allowing the pressure to build up to an equilibrium pressure, and this method of operation forms the subject of United States Patent No. 2,648,623.

When autofining under equilibrium pressure conditions the pressure rises to a maximum within a relatively short period of 5 to 25 hours, and thereafter falls gradually as the dehydrogenating activity of the catalyst decreases. The extent of the desulphurisation follows a similar pattern. The length of the run, i. e. the hours on stream before regeneration, is therefore governed by the rate at which the desulphurisation falls. For example, with a gas oil feedstock of 1.3% by weight sulphur when operating at 2.0 v./v./hr. a bulked sulphur of 0.1% by weight is obtained over 200 hours on stream although by the end of this period the residual sulphur content is in the region of 0.3 to 0.4% by weight.

According to the present invention, a process for the hydrocatalytic desulphurisation of a petroleum feedstock, comprises contacting the feedstock in the presence of extraneous hydrogen with a sulphur-resistant dehydrogenation-hydrogenation catalyst under autofining conditions of temperature and space velocity and at a pressure which is approximately equal to the equilibrium pressure to be obtained on autofining the feedstock under the same conditions of catalyst, temperature and space velocity.

By operating in this manner, the fall-off of the dehydrogenating activity of the catalyst that occurs in autofining is retarded and the hours on stream before regeneration are considerably lengthened as compared with autofining. The process shows considerable economic advantage in that the overall hydrogen consumption is reduced to only a fraction of that required when carrying out a hydrofining operation at the conventional higher pressures.

The temperature and space velocity required for any particular feedstock can easily be determined by experiment but in general the following ranges of conditions apply:

Temperature _____ 750–800° F.
Space velocity _____ 1–5 v./v./hr.

The equilibrium pressure to be obtained on autofining any particular feedstock can readily be determined by experiment. A particularly effective catalyst for use in the process of the invention consists of the oxides of cobalt and molybdenum incorporated with or deposited on alumina. Improved results are obatined if the catalyst contains fluorine which is advantageously present in an amount between 1 and 4% by weight of the catalyst, since it has been found that the presence of the fluorine increases the dehydrogenating activity of the catalyst and thereby enables higher equilibrium pressures to be built up resulting in increased desulphurisation. Methods of preparing cobalt oxide-molybdenum oxide catalysts containing fluorine are described in United States application No. 311,429 filed September 25, 1952.

The invention will now be described with reference to the following examples:

EXAMPLE 1

*Desulphurisation of Kuwait straight run gas oil containing 1.3% wt. sulphur to give a product of 0.1% wt. sulphur, using catalytic reformer gases containing ca. 70% mol. hydrogen*

| | Hydrofining at autofining equilibrium pressure | Conventional hydrofining | | | |
|---|---|---|---|---|---|
| Catalyst | F activated Co-Mo oxides on alumina. | Co-Mo oxides on alumina. | Co-Mo oxides on alumina. | Co-Mo oxides on alumina. | F activated Co-Mo oxides on alumina. |
| Pressure, p. s. i. ga | 365 | 500 | 500 | 1,000 | 500. |
| Temperature, ° F | 780 | 800 | 780 | 780 | 780. |
| Space Velocity, v./v./hr | 2 | 2 | 4 | 8 | 4. |
| Recycle Rate, S. C. F./B | 6,400 | 4,000 | 4,000 | 4,000 | 4,000. |
| Hydrogen Consumption, S. C. F./B | 30 | 103 | 104 | 155 | 93. |

EXAMPLE 2

Desulphurisation of Kuwait straight run gas oil containing 1.3% wt. sulphur to give a product of 0.1% wt. sulphur, using pure hydrogen (>99% mol.)

|  | Hydrofining at autofining equilibrium pressure | Conventional hydrofining | | |
|---|---|---|---|---|
| Catalyst | F activated Co-Mo oxides on alumina. | Co-Mo oxides on alumina. | Co-Mo oxides on alumina. | Co-Mo oxides on alumina. |
| Pressure, p. s. i. ga. | 365 | 1,000 | 500 | 1,000. |
| Temperature, °F | 780 | 780 | 780 | 780. |
| Space Velocity, v./v./hr | 2 | 2 | 4 | 8. |
| Recycle Rate, S. C. F./B | 2,000 | 4,000 | 4,000 | 4,000. |
| Hydrogen Consumption, S. C. F./B | 65 | 288 | 127 | 210. |

EXAMPLE 3

The following data show the effect of hours on stream on residual sulphur content when desulphurising a Kuwait straight-run gas oil containing 1.3% wt. sulphur by:
(a) autofining under equilibrium pressure conditions,
(b) hydrofining at the autofining equilibrium pressure using catalytic reformer hydrogen (ca. 70% $H_2$)

|  | Autofining | | | | Hydrofining | | | |
|---|---|---|---|---|---|---|---|---|
| Catalyst | F activated Co-Mo oxides on alumina. | | | | F activated Co-Mo oxides on alumina. | | | |
| Temperature, °F | 780 | | | | 780. | | | |
| Space Velocity, v./v./hr | 2 | | | | 2. | | | |
| Recycle rate, S. C. F./B | 2,000 (set at 100 p. s. i. ga.). | | | | 6,400. | | | |
| Initial pressure, p. s. i. ga | 100 | | | | 320. | | | |
| Hours on stream | 10 | 50 | 100 | 150 | 10 | 50 | 100 | 150 |
| Pressure p. s. i. ga | 285 | 265 | 220 | 125 | 360 | 365 | 365 | 365 |
| Residual sulphur, percent wt | 0.04 | 0.09 | 0.19 | 0.15 | 0.04 | 0.04 | 0.05 | 0.07 |

We claim:
1. A process for the hydrocatalytic desulphurisation of a petroleum feedstock, which comprises contacting the feedstock in a reaction zone in the presence of extraneous hydrogen with a sulphur-resistant dehydrogenation-hydrogenation catalyst under autofining conditions of temperature and space velocity and establishing in the reaction zone from the start by means of the extraneous hydrogen a pressure which is approximately equal to the initial autofining equilibrium pressure to be obtained on autofining the feedstock under the same conditions of catalyst, temperature and space velocity.

2. A process according to claim 1, which is carried out at a temperature within the range 750–800° F. and at a space velocity of the liquid feedstock of 1 to 5 v./v./hr.

3. A process according to claim 1, wherein said catalyst essentially consists of the oxides of cobalt and molybdenum supported on alumina and contains from 1 to 4% by weight of fluorine.

4. A process according to claim 1, wherein said petroleum feedstock is a gas oil.

References Cited in the file of this patent

UNITED STATES PATENTS

| 2,498,559 | Layng et al. | Feb. 21, 1950 |
| 2,577,823 | Stine | Dec. 11, 1951 |
| 2,648,623 | Porter et al. | Aug. 11, 1953 |
| 2,658,028 | Hansel et al. | Nov. 3, 1953 |
| 2,697,683 | Engel et al. | Dec. 21, 1954 |

OTHER REFERENCES

Hoog et al.: Oil & Gas Journal, vol. 52, No. 5, pages 92 and 94 to 96 (June 8, 1953).